(12) United States Patent
Luo et al.

(10) Patent No.: US 10,720,770 B2
(45) Date of Patent: Jul. 21, 2020

(54) POWER SUPPLY CIRCUIT, METHOD, AND PORTABLE DEVICE

(71) Applicant: Fairchild Semiconductor Corporation, San Jose, CA (US)

(72) Inventors: Roger Luo, Shanghai (CN); Percy Shi, Shanghai (CN); Kevin Yang, Shanghai (CN)

(73) Assignee: Fairchild Semiconductor Corporation, Phoenix, AZ (US)

(*) Notice: Subject to any disclaimer, the term of this patent is extended or adjusted under 35 U.S.C. 154(b) by 1284 days.

(21) Appl. No.: 14/286,043

(22) Filed: May 23, 2014

(65) Prior Publication Data
US 2014/0346876 A1 Nov. 27, 2014

(30) Foreign Application Priority Data
May 24, 2013 (CN) .......................... 2013 1 0204602

(51) Int. Cl.
*H02J 1/00* (2006.01)
*G06F 1/26* (2006.01)

(52) U.S. Cl.
CPC ............... *H02J 1/00* (2013.01); *G06F 1/266* (2013.01); *Y10T 307/50* (2015.04)

(58) Field of Classification Search
CPC ........... H02J 1/00; G06F 1/266; Y10T 307/50
USPC .......................................................... 307/43
See application file for complete search history.

(56) References Cited

U.S. PATENT DOCUMENTS

| | | | | |
|---|---|---|---|---|
| 7,310,697 | B2* | 12/2007 | Pandit | G06F 1/266 710/313 |
| 2006/0095641 | A1* | 5/2006 | Pandit | G06F 1/266 710/313 |
| 2006/0223486 | A1* | 10/2006 | Ruff | H04M 1/24 455/343.1 |
| 2008/0133802 | A1* | 6/2008 | Nagamine | G06F 13/4282 710/63 |
| 2008/0265838 | A1* | 10/2008 | Garg | G06F 1/266 320/115 |
| 2009/0198841 | A1* | 8/2009 | Yoshida | G06F 13/4295 710/16 |

FOREIGN PATENT DOCUMENTS

| | | | | |
|---|---|---|---|---|
| CN | 102801064 A | 11/2012 | | |
| WO | WO 2011157243 A2 * | 12/2011 | ............ | H02J 7/0004 |
| WO | WO-2011157243 A2 | 12/2011 | | |

OTHER PUBLICATIONS

"Chinese Application Serial No. 201310204602.4, Office Action dated May 5, 2016", w/ English Translation, 10 pgs.

* cited by examiner

*Primary Examiner* — Hal Kaplan
*Assistant Examiner* — Swarna N Chowdhuri
(74) *Attorney, Agent, or Firm* — Brake Hughes Bellermann LLP

(57) ABSTRACT

The disclosure provides a power supply circuit including an external power source, an ID pin provided in a universal serial bus (USB) port on a printed circuit board (PCB), and an internal power and signal management subsystem. The external power source is configured to power the internal power and signal management subsystem via the ID pin. A power supply method and a portable device are also disclosed.

15 Claims, 4 Drawing Sheets

//POWER SUPPLY CIRCUIT, METHOD, AND PORTABLE DEVICE

CLAIM OF PRIORITY

The application claims the benefit of priority under 35 U.S.C. § 119(a) to Roger Luo et al., CN Application No. 201310204602.4, filed on May 24, 2013, which is hereby incorporated by reference in its entirety.

TECHNICAL FIELD

The present disclosure, among others, relates to power supply technologies, and in particular, to a power supply circuit, method, and portable device.

BACKGROUND

Portable devices are advantageous in having small sizes and being easy to carry, and accordingly are very popular with users.

During the development, manufacture, and use of a portable device, and in some special application environments, an external power source can be used to power an internal power and signal management subsystem (IPSMS), which is arranged on a printed circuit board (PCB) in the portable device. For example, in the process of manufacturing the portable device, it can be necessary to perform a performance test on a printed circuit board assembly (PCBA) in the portable device to ensure that the PCBA in the portable device to be presented to a user functions properly.

Currently, the external power source generally powers the IPSMS by means of a special cable and a special connector. As shown in FIG. 1, in a typical implementation, the external power source powers the IPSMS through a VBAT pin in a port of the portable device. The port of the portable device has seven pins (e.g., a VBUS pin, a D– pin, a D+ pin, two GND pins, and a VBAT pin). Since the VBAT pin is not a pin in accordance with universal serial bus (USB) specifications, the special cable and the special connector are required to connect the external power source with the port of the portable device. However, the special cable and the special connector have to be customized, adding cost and complication to the design of the IPSMS.

Overview

In view of the above, the present disclosure provides, among others, a power supply circuit, method, and portable device.

In an embodiment, a power supply circuit is provided, which includes an external power source, an identification (ID) pin arranged in a USB port on a PCB, and an IPSMS. The external power source is configured to power the IPSMS using, for example, the ID pin.

In an embodiment, a portable device is provided, which includes a casing and a CPU. The portable device further includes a power supply circuit including an external power source, an ID pin arranged in a USB port on a PCB, and an internal power and signal management subsystem. The external power source is configured to power the internal power and signal management subsystem via the ID pin.

In an embodiment, a power supply method is provided, in which an external power source powers an internal power and signal management subsystem via an ID pin arranged in an USB port on a PCB.

In the power supply circuit and method and the portable device according to the present disclosure, the external power source powers the IPSMS via the ID pin arranged in the USB port on the PCB. As such, when the external power source is used to power the IPSMS, a common USB port and cable can be used to connect the external power source with the USB port on the PCB, and it is not necessary to use a customized cable and connector.

In addition, in the implementation of the present disclosure, when the ID pin is configured to perform signal detection and the IPSMS is required to be powered, a signal control circuit outputs a control signal to the ID pin to electrically connect the ID pin with the external power source. As such, existing functions of the ID pin would not be affected.

Furthermore, in the implementation of the present disclosure, since the external power source powers the IPSMS via the ID pin, after the IPSMS is powered on, the USB host may still be able to perform, via the D– pin and the D+ pin, normal USB communication with other functional modules of the portable device in which the IPSMS resides.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

According to various aspects of the present disclosure, an external power source can power an internal power and signal management subsystem via an ID pin provided in an USB port on a PCB.

The subject matter will be further described in detail with reference to the accompanying drawings and particular embodiments.

Figure 1:
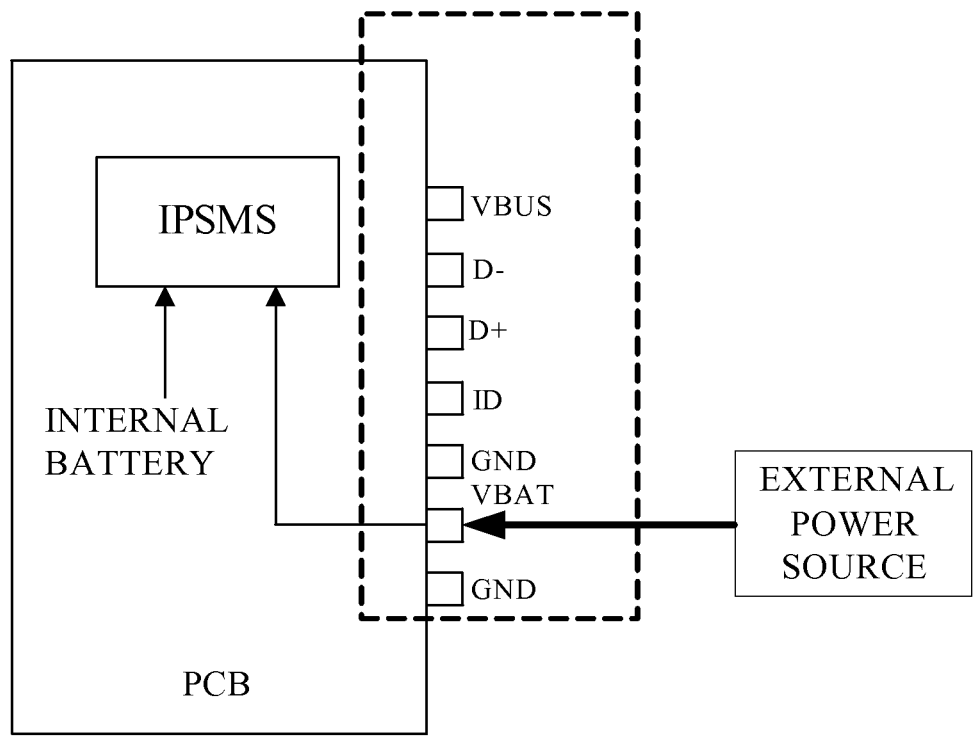
FIG. 1 is a schematic diagram of an existing power supply circuit in which an IPSMS is powered by an external power source.
Figure 2:
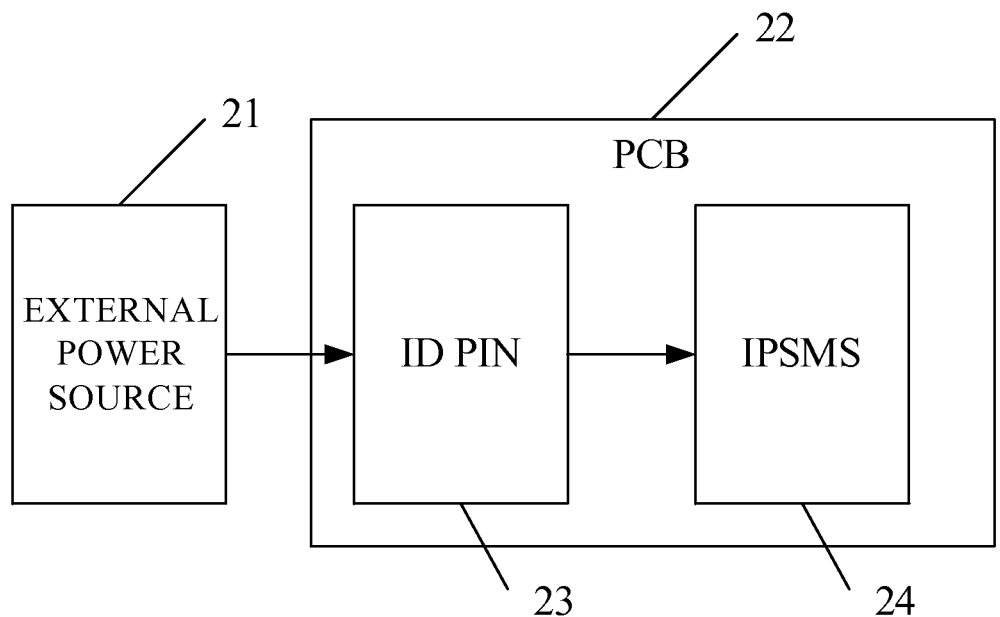
FIG. 2 is a schematic diagram of the structure of a power supply circuit according to an embodiment of the present disclosure.

The structure of the power supply circuit according to an embodiment of the present disclosure is shown in FIG. 2.

The power supply circuit in FIG. 2 includes an external power source 21, an ID pin 23 arranged in a USB port on a PCB 22 and an IPSMS 24. The external power source 21 of FIG. 2 is configured to power the IPSMS 24 via the ID pin 23.

In this embodiment, the external power source 21 is a power source outside (not inside) a portable device in which the PCB 22 resides. The external power source 21 may be a lithium battery, or a DC power source which can provide a same voltage as that can be provided by a lithium battery. The USB may be a Micro USB or a Mini USB, as defined in one or more USB specifications. The IPSMS 24 is arranged on the PCB 22, and the ID pin 23 is connected with a power port of the IPSMS 24 via a trace on the PCB 22. The IPSMS 24 is configured to manage operations related to the power supply and signal processing of the portable device in which the PCB 22 resides.

Figure 3:
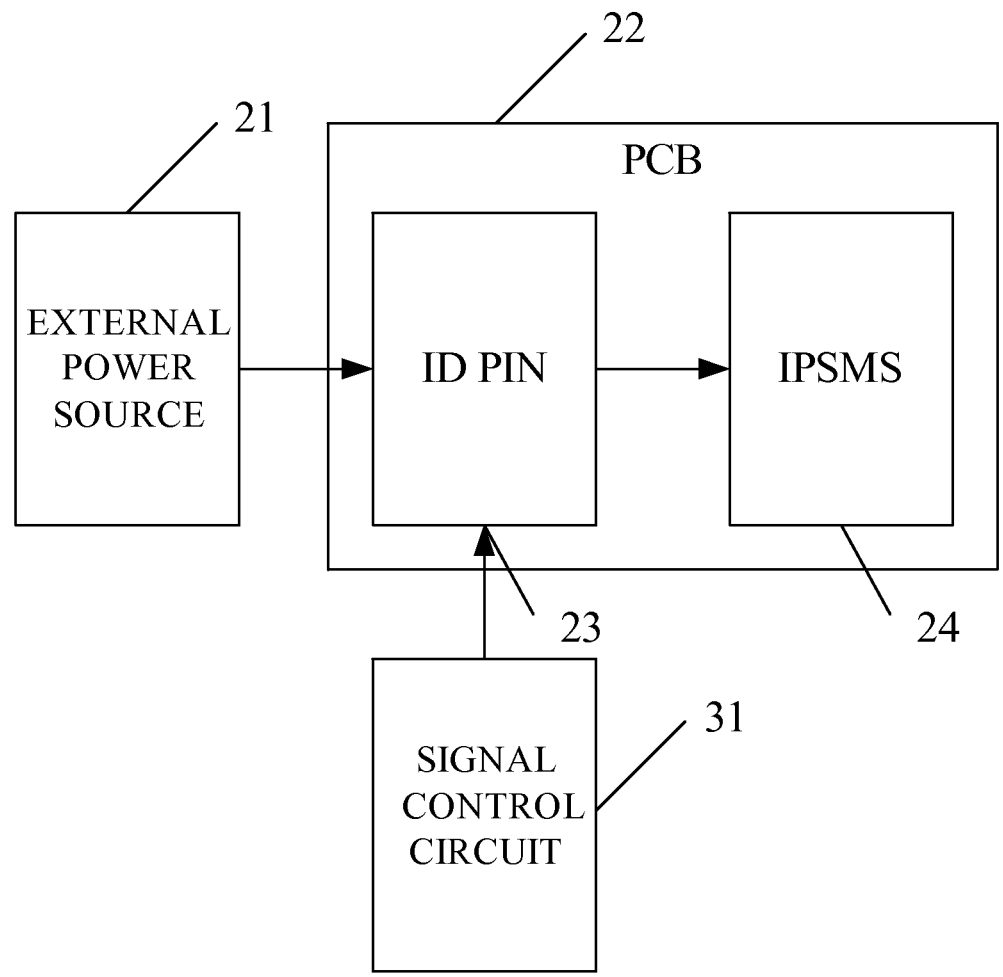
FIG. 3 is a schematic diagram of the structure of another power supply circuit according to an embodiment of the present disclosure.

The structure of another power supply circuit according to an embodiment of the present disclosure is shown in FIG. 3. In this embodiment, when the ID pin 23 is also configured to perform signal detection, the power supply circuit may further include a signal control circuit 31 configured to output a control signal to the ID pin 23 to electrically connect the ID pin 23 with the external power source 21 when the IPSMS 24 is required to be powered.

In the embodiment of FIG. 3, the signal control circuit 31 may further include a resistance output circuit and a connecting circuit. The resistance output circuit is configured to output a resistance to ground having a resistance value corresponding to an indication of powering the internal power and signal management subsystem. The connecting circuit is configured to connect the IP pin 23 with the external power source 21 upon detection of the resistance to ground having the resistance value. In this embodiment, signal detection means signal detection as defined in the USB specifications.

The resistance to ground, which has a resistance value corresponding to an indication of powering the internal power and signal management subsystem, may be set as desired. For example, the resistance to ground may have a resistance value of 10.03 kΩ.

In the power supply circuit according to the present disclosure, the external power source 21 can be connected with the ID pin 23 via a common USB cable and connector. The ID pin 23 is connected with the power port of the IPSMS 24 via the a trace on the PCB 22. When the IPSMS 24 is being powered, the current provided by the external power source flows in sequence through the common USB cable and connector, the ID pin 23, the trace on the PCB 22 connected to the power port of the IPSMS 24, and the power port of the IPSMS 24, finally to the IPSMS 24, so as to implement power supply to the IPSMS 24.

When the ID pin 23 is further configured to perform signal detection, and the IPSMS 24 has to be powered using the external power source 21, the resistance output circuit of the signal control circuit 31 outputs to the ID pin 23 a resistance to ground having a resistance value corresponding to an indication of powering the internal power and signal management subsystem, and the connecting circuit of the signal control circuit 31 connects the ID pin 23 with the external power source 21 upon detection of the resistance to ground having the resistance value, thereby implementing power supply to the IPSMS 24.

Figure 4:
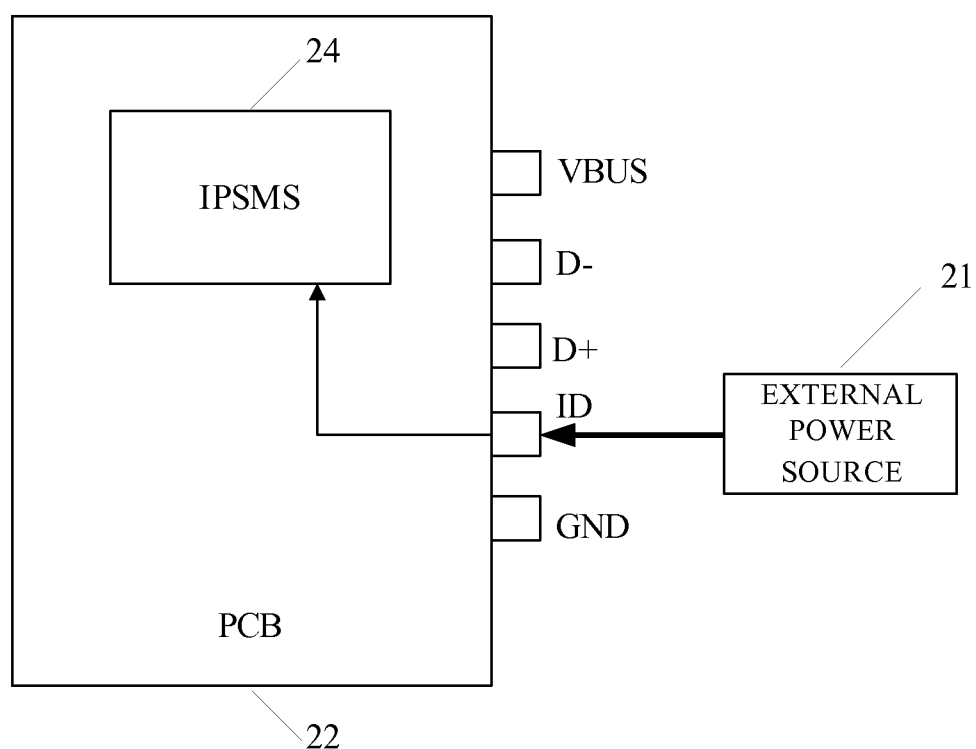
FIG. 4 is a schematic diagram of the structure of a power supply circuit without an internal power source according to an embodiment of the present disclosure.
Figure 5:
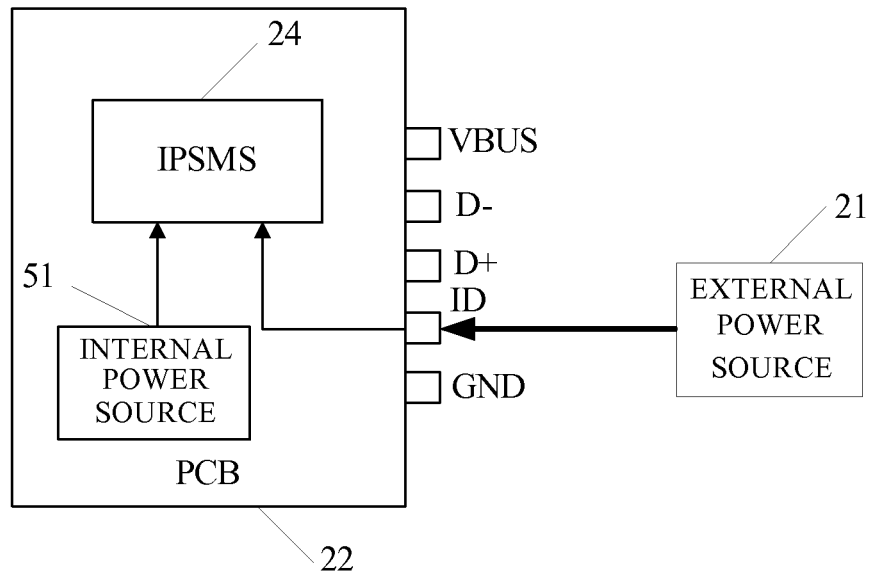
FIG. 5 is a schematic diagram of the structure of a power supply circuit with an internal power source according to an embodiment of the present disclosure.

FIG. 4 shows a structure of a power supply circuit without an internal power source according to an embodiment of the present disclosure, and FIG. 5 shows a structure of a power supply circuit without an internal power source according to an embodiment of the present disclosure. In particular, in the power supply circuit as shown in FIG. 4, the USB port includes five pins (i.e., a VBUS pin, a D− in, a D+ pin, an ID pin and a GND pin). In an example, the VBUS pin, the D− in, the D+ pin and ID pin can function the same as those defined in the USB specifications, and the ID pin can be connected with a power port of the IPSMS 24 via the trace on the PCB 22. The power supply circuit as shown in FIG. 5 is distinct from the power supply circuit as shown in FIG. 4 in that there is an internal power source 51 connected with another power port of the IPSMS 24. As such, the IPSMS 24, when having to be powered, may choose either the external power source 21 or the internal power source 51 for power supply. In this embodiment, the internal power source 51 is a power source inside the portable device in which IPSMS 24 resides.

With respect to the power supply circuits as shown in FIG. 4 and FIG. 5, when the external power source 21 powers the IPSMS 24 via the ID pin, the current provided by the external power source 21 flows, in sequence, through the universal USB cable and connector, the ID pin, the trace on the PCB 22 connected with the power port of the IPSMS 24, and the power port of the IPSMS 24, and finally arrives at the IPSMS 24, so as to implement power supply to the IPSMS 24.

With the power supply circuit as shown in FIG. 4 or FIG. 5, the IPSMS can still be powered even if the portable device in which the IPSMS resides does not have an internal power source. In other words, even without an internal power source, the portable device can still be powered, and after the portable device is powered on, some applications can be activated, such as, a clock application.

Figure 6:
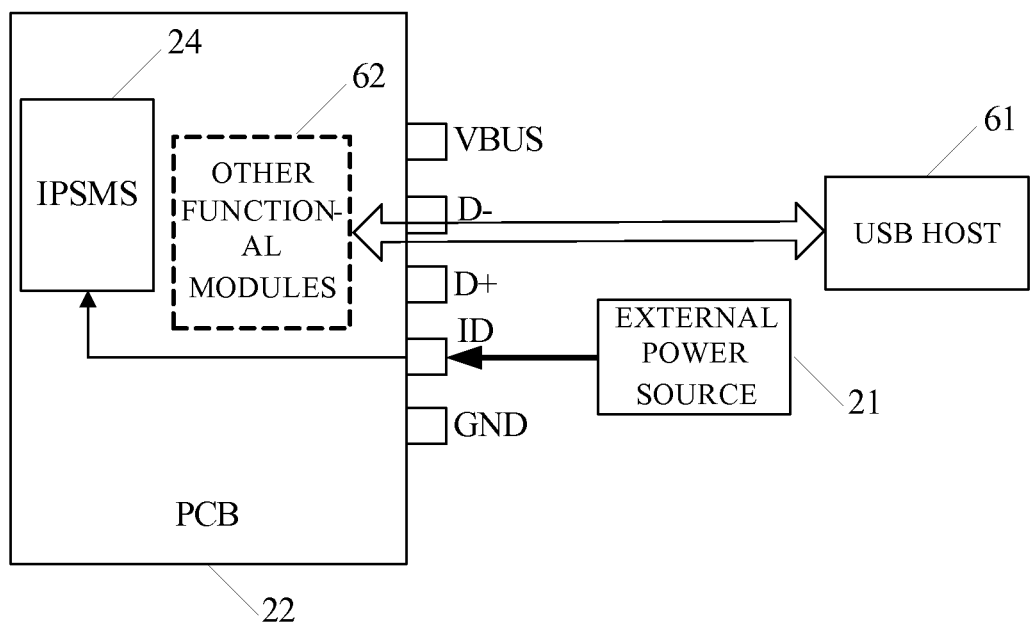
FIG. 6 is a schematic diagram of the structure of a power supply circuit performing USB communication according to an embodiment of the present disclosure.

As shown in FIG. 6, the USB port includes five pins (i.e., a VBUS pin, a D− pin, a D+ pin, an ID pin, and a GND pin). In an example, the VBUS pin, the D− in, the D+ pin and ID pin can function the same as those defined in the USB specifications, and the ID pin can be connected with the power port of the IPSMS 24 via the trace on the PCB 22. When the external power source 21 powers the IPSMS 24 via the ID pin, the current provided by the external power source 21 flows, in sequence, through the common USB cable and connector, the ID pin 23, the trace on the PCB 22 connected to the power port of the IPSMS 24, and the power port of the IPSMS 24, and finally arrives at the IPSMS 24, so as to implement power supply to the IPSMS 24.

Since the external power source 21 powers the IPSMS 24 via the ID pin, when the IPSMS is powered on, the USB host 61 may still be able to perform normal USB communications via the D− pin and the D+ pin with other functional modules 62 of the portable device in which the IPSMS 24 resides.

Portable Device Embodiment

Based on the aforementioned power supply circuit, the present disclosure further provides a portable device. The portable device includes a casing, a central processing unit (CPU), and a power supply circuit. As shown in FIG. 2, the power supply circuit includes: an external power source 21, an ID pin 23 arranged in a USB port on a PCB 22 and an IPSMS 24. The external power source 21 is configured to power the IPSMS 24 via the ID pin 23.

In this embodiment, the external power source 21 is a power source outside the portable device in which the PCB 22 resides, but not a power source inside the portable device in which the PCB 22 resides. The external power source 21 may be a lithium battery, or a DC power source which can provide the same voltage as that can be provided by a lithium battery. The USB may be a Micro USB or a Mini USB, as defined in the USB specifications. The IPSMS 24 is arranged on the PCB 22, and the ID pin 23 is connected with the power port of the IPSMS 24 via the trace on the PCB 22. The IPSMS 24 is configured to manage the operations related to the power supply and signal processing of the portable device in which the PCB 22 resides.

Referring to FIG. 3, when the ID pin 23 is also configured to perform signal detection, the power supply circuit may further include a signal control circuit 31 configured to output a control signal to the ID pin 23 to connect the ID pin 23 with the external power source 21 when the IPSMS 24 has to be powered.

In this embodiment, the signal control circuit 21 may further include a resistance output circuit and a connecting circuit. The resistance output circuit is configured to output a resistance to ground having a resistance value corresponding to an indication of powering the internal power and signal management subsystem. The connecting circuit is configured to connect the IP pin 23 with the external power source 21 upon detection of the resistance to ground having the resistance value. In this embodiment, the signal detection means signal detection as defined in the USB specifications.

The resistance to ground having a resistance value corresponding to an indication of powering the internal power and signal management subsystem may be set as desired. For example, the resistance to ground may have a resistance value of 10.03 kΩ.

In the power supply circuit according to the present disclosure, the external power source 21 can be connected with the ID pin 23 via a common USB cable and connector. The ID pin 23 is connected with the power port of the IPSMS 24 via the trace on the PCB 22. When the IPSMS 24 is being powered, the current provided by the external power source flows, in sequence, through the universal USB cable and connector, the ID pin 23, the trace on the PCB 22 connected to the power port of the IPSMS 24, and the power port of the IPSMS 24, and finally arrives at the IPSMS 24 to implement power supply to the IPSMS 24.

When the ID pin 23 is further configured to perform signal detection, and the IPSMS 24 is required to be powered using the external power source 21, the resistance output circuit of the signal control circuit 31 outputs to the ID pin 23 a resistance to ground having a resistance value corresponding to an indication of powering the internal power and signal management subsystem, and the connecting circuit of the signal control circuit 31 connects the IP pin 23 with the external power source 21 upon detection of the resistance to ground having the resistance value, thereby implementing power supply to the IPSMS 24.

In the power supply circuit as shown in FIG. 4, the USB port includes five pins (i.e., a VBUS pin, a D− in, a D+ pin, an ID pin and a GND pin). In an example, the VBUS pin, the D− in, the D+ pin and ID pin can function the same as those defined in the USB specifications, and the ID pin can be connected with a power port of the IPSMS 24 via a trace on the PCB 22. The power supply circuit as shown in FIG. 5 is distinct from the power supply circuit as shown in FIG. 4 in that there is an internal power source 51 connected with another power port of the IPSMS 24. As such, the IPSMS 24, when being required to be powered, may choose either the external power source 21 or the internal power source 51 for power supply as desired.

With respect to the power supply circuits as shown in FIG. 4 and FIG. 5, when the external power source 21 powers the IPSMS 24 via the ID pin, the current provided by the external power source 21 flows, in sequence, through a common USB cable and connector, the ID pin, the trace on the PCB 22 connected with the power port of the IPSMS 24, and the power port of the IPSMS 24, and finally arrives at the IPSMS 24, so as to implement power supply to the IPSMS 24. In this embodiment, the internal power source 51 is a power source inside the portable device in which IPSMS 24 resides.

With the power supply circuit as shown in FIG. 4 or FIG. 5, the IPSMS can still be powered even if the portable device in which the IPSMS resides does not have an internal power source. In other words, even without an internal power source, the portable device can still be powered, and after the portable device is powered on, some applications can be activated, for example, a clock application.

As shown in FIG. 6, the USB port includes five pins (i.e., a VBUS pin, a D− pin, a D+ pin, an ID pin, and a GND pin). In an example, the VBUS pin, the D− in, the D+ pin and ID pin can function the same as those defined in the USB specifications, and the ID pin can be connected with a power port of the IPSMS 24 via a trace on the PCB 22. When the external power source 21 powers the IPSMS 24 via the ID pin, the current provided by the external power source 21 flows, in sequence, through the common USB cable and connector, the ID pin 23, the trace on the PCB 22 connected to the power port of the IPSMS 24, and the power port of the IPSMS 24, and finally arrives at the IPSMS 24, so as to implement power supply to the IPSMS 24.

Since the external power source 21 powers the IPSMS 24 via the ID pin, when the IPSMS is powered on, the USB host 61 may still be able to perform normal USB communications via the D− pin and the D+ pin with other functional modules 62 of the portable device in which the IPSMS 24 resides.

Based on the power supply circuit as described above, the present disclosure further provides a power supply method, in which an external power source powers an IPSMS via an ID pin arranged in an USB port on a PCB.

In this embodiment, the external power source 21 is a power source outside (not inside) a portable device in which the PCB 22 resides. The external power source 21 may be a lithium battery, or a DC power which can provide the same voltage as that can be provided by a lithium battery. The USB may be a Micro USB or a Mini USB, as defined in the USB specifications.

The IPSMS 24 is arranged on the PCB 22, and accordingly, when being powered, the current flowing through the ID pin will flow to the power port of the IPSMS 24 via the trace on the PCB 22.

In the method, when the ID pin 23 is also configured to perform signal detection, and when the IPSMS is required to be powered, a signal control circuit outputs a control signal to the ID pin to electrically connect the ID pin with the external power source.

In particular, a resistance to ground having a resistance value corresponding to an indication of powering the internal power and signal management subsystem is outputted, and the IP pin is connected with the external power source upon detection of the resistance to ground having the resistance value.

The resistance to ground, having a resistance value corresponding to an indication of powering the internal power and signal management subsystem, may be set as desired. For example, the resistance to ground may have a resistance value of 10.03 kΩ.

The above description is only the preferred embodiments of the present disclosure, and is not intended to limit the scope thereof.

ADDITIONAL NOTES AND EXAMPLES

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A power supply circuit comprising:
    an identifier (ID) pin arranged in a universal serial bus (USB) port on a printed circuit board (PCB);
    an internal power and signal management subsystem (IPSMS) configured to perform a performance test on the PCB, and
    a signal control circuit configured to output a control signal to the ID pin to connect the ID pin with an external power source when the internal power and signal management subsystem is be powered, the signal control circuit including:
        a resistance output circuit configured to output a resistance to ground having a resistance value corresponding to an indication of powering the internal power and signal management subsystem; and
        a connecting circuit configured to connect the ID pin with the external power source upon detection of the resistance to ground having the resistance value, and
    wherein the internal power and signal management subsystem is configured to be powered by the external power source via the ID pin.

2. The power supply circuit according to claim 1, wherein the external power source includes a lithium battery configured to provide a voltage or a direct current (DC) power source configured to provide the same voltage as the lithium battery.

3. The power supply circuit according to claim 1, wherein the USB port is a Micro USB port or a Mini USB port.

4. The power supply circuit according to claim 1, wherein the internal power and signal management subsystem is arranged on the PCB, and the ID pin is connected with a power port of the internal power and signal management subsystem via a trace on the PCB.

5. A portable device comprising:
    a casing; and
    a central processing unit (CPU);
    a power supply circuit, including:
        an identifier (ID) pin arranged in a universal serial bus (USB) port on a printed circuit board (PCB);
        an internal power and signal management subsystem configured to perform a performance test on the PCB, a signal control circuit configured to output a control signal to the ID pin to connect the ID pin with an external power source when the internal power and signal management subsystem is be powered, the signal control circuit including:

a resistance output circuit configured to output a resistance to ground having a resistance value corresponding to an indication of powering the internal power and signal management subsystem; and a connecting circuit configured to connect the ID pin with the external power source upon detection of the resistance to ground having the resistance value, and wherein the internal power and signal management subsystem is configured to be powered by the external power source via the ID pin.

6. The portable device according to claim 5, wherein the external power source includes a lithium battery configured to provide a voltage or a direct current (DC) power source configured to provide the same voltage as the lithium battery.

7. The portable device according to claim 5, wherein the USB port is a Micro USB port or a Mini USB port.

8. The portable device according to claim 5, wherein the internal power and signal management subsystem is arranged on the PCB, and the ID pin is connected with a power port of the internal power and signal management subsystem via a trace on the PCB.

9. A power supply method, comprising:

powering an internal power and signal management subsystem via an identifier (ID) pin arranged in a universal serial bus (USB) port on a printed circuit board (PCB), the internal power and signal management subsystem being configured to perform a performance test on the PCB; and outputting, by a signal control circuit, a control signal to the ID pin to connect the ID pin with an external power source when the internal power and signal management subsystem is be powered, including:

outputting a resistance to ground having a resistance value corresponding to an indication of powering the internal power and signal management subsystem; and connecting the ID pin with the external power source upon detection of the resistance to ground having the resistance value.

10. The method according to claim 9, wherein the external power source includes a lithium battery configured to provide a voltage or a direct current (DC) power source configured to provide the same voltage as the lithium battery.

11. The method according to claim 9, wherein the USB port is a Micro USB port or a Mini USB port.

12. The method according to claim 9, wherein the internal power and signal management subsystem is arranged on the PCB, and, when the internal power and signal management subsystem is being powered, a current flowing through the ID pin flows to a power port of the internal power and signal management subsystem via a trace on the PCB.

13. The method according to claim 12, wherein powering, by the external power source, the internal power and signal management subsystem via the ID pin arranged in the USB port of the PCB comprises using a power source outside a portable device in which the PCB resides.

14. The method according to claim 13, wherein powering, by the external power source, the internal power and signal management subsystem via the ID pin arranged in the USB port on the PCB comprises connecting a power port of the internal power and signal management subsystem with a trace on the PCB.

15. The power supply as in claim 4, wherein electrical current provided to the IPSMS by the external power source flows, in sequence, through a USB cable, a USB connector at the end of the USB cable, the ID pin, the trace connecting the ID pin and the power port of the IPSMS, and the IPSMS.

\* \* \* \* \*